US005860328A

United States Patent [19]

Regueiro

[11] Patent Number: 5,860,328

[45] Date of Patent: Jan. 19, 1999

[54] SHAFT PHASE CONTROL MECHANISM WITH AN AXIALLY SHIFTABLE SPLINED MEMBER

[75] Inventor: Jose F. Regueiro, Rochester Hills, Mich.

[73] Assignee: Chrysler Corporation, Auburn Hills, Mich.

[21] Appl. No.: 749,123

[22] Filed: Nov. 14, 1996

Related U.S. Application Data

[63] Continuation-in-part of Ser. No. 493,605, Jun. 22, 1995, abandoned.

[51] Int. Cl.[6] .......... F16H 53/00

[52] U.S. Cl. .......... 74/568 R; 74/567; 123/90.17

[58] Field of Search .......... 74/567–568 R; 123/90.17, 90.31, 90.34; 464/2, 1, 160

[56] References Cited

U.S. PATENT DOCUMENTS

| | | | |
|---|---|---|---|
| 3,945,221 | 3/1976 | Miokovic . | |
| 4,302,985 | 12/1981 | Natkin . | |
| 4,561,390 | 12/1985 | Nakamura et al. | 123/90.15 |
| 5,111,780 | 5/1992 | Hannibal | 123/90.17 |
| 5,365,898 | 11/1994 | Mueller | 74/568 R X |
| 5,542,383 | 8/1996 | Clarke et al. | 123/90.17 |
| 5,673,659 | 10/1997 | Regueiro | 123/90.17 |
| 5,680,037 | 10/1997 | Pierik | 123/90.17 |
| 5,680,836 | 10/1997 | Pierik | 123/90.17 |
| 5,687,681 | 11/1997 | Hara | 74/568 R X |
| 5,732,589 | 3/1998 | McClellan et al. | 74/568 R X |

OTHER PUBLICATIONS

Demmelbauer–Ebner, Dachs, Lenz, "Variable Valve Actuation", *Automotive Engineering*, Oct. 1991, pp. 12–16.

All In The Timing (AC's Variable Cam Phaser–VCP). *Automotive Industries*, Jun. 1992, p. 19.

Scott, "Variable Valve Timing Has Electronic Control", *Automotive Engineering*, May 1984, pp. 86, 87.

Stone, "Variable Valve Time for I.C. Engines", *Automotive Engineer*, Aug./Sep. 1983, pp. 54–58.

*Diesel & Gas Turbine Worldwide Cat.*, vol. 41, 1976 Ed., p. 1108.

*Diesel & Gas Turbine Worldwide Cat.*, vol. 58, 1993 Edition.

*Diesel & Gas Turbine Worldwide Cat.*, vol. 41, 1976 Ed., p. 1129.

*Diesel & Gas Turbine Worldwide Cat.*, vol. 41, 1976 Ed., p. 1135.

*Diesel & Gas Turbine Worldwide Cat.*, vol. 51, 1986 Ed., p. 1073.

Regueiro, Korn, "Geometric Parameters of Four Valve Cylinder Heads and Their Relationships to Combustion and Engine Full Load Performance", SAE Technical Paper Series 940205, Presented to the International Congress & Expostion, Detroit, MI, Feb. 28–Mar. 3, 1994.

Going Trhough A Phase (AC Delco's Cam phasing Technology) *Automotive Industries*, Nov. 1994, p. 21.

*Primary Examiner*—Vinh T. Luong

*Attorney, Agent, or Firm*—Kenneth H. Maclean

[57] ABSTRACT

A camshaft timing device includes a camshaft 10 and a drive gear 20 rotatably mounted thereon. An interconnecting shifting shaft 30 has spline 31 and 33 that interconnect with respective splines 16 and 41 on the camshaft and a hub of a drive gear 20. Axial movement of the shaft 30 causes the shaft to rotate the camshaft 30 with respect to the drive gear 20 due to the helical nature of the splines 33 and 41. The axial movement of the shaft 30 is caused by a drive sleeve 50 connected to a pinion gear that is driven through a worm gear 63 by an electric motor 67.

11 Claims, 6 Drawing Sheets

SHAFT PHASE CONTROL MECHANISM WITH AN AXIALLY SHIFTABLE SPLINED MEMBER

CROSS-REFERENCE TO RELATED APPLICATION

This application is a continuation-in-part of application Ser. No. 08/493,605, filed Jun. 22, 1995 now abandoned entitled "An Angular Phase Controlling System for Controlling the Timing of Rotatable Shafts" by the same inventor (sole) as in the subject application.

TECHNICAL FIELD

The field of this invention relates to mechanisms for coupling two coaxial rotatable shafts in a manner permitting selective adjustment of their respective angular phase relationship, particularly useful with internal combustion engines for providing a variable valve timing system or for providing a selectively timed fuel injection pump system.

BACKGROUND OF THE DISCLOSURE

For use in powering a vehicle, an internal combustion engine must react to a variety of operating conditions to effectively provide desired performance. A technique to achieve such desired performance involves a system to selectively adjust the timing or phasing of the opening and closing of the engine's valves relative to rotation of the engine's crankshaft. Selective control of the intake valves is particularly effective. Likewise, particularly as concerns diesel engines, selective control of the timing of a fuel injection pump offers distinct advantages.

Known devices include sections of two rotating shafts being machined with splines with at least one of the shafts having helical splines. Another connecting shaft or shifting sleeve engages one rotating shaft with the other rotating shaft and has two sets of splines designed to mesh with the respective rotating shafts. The relative rotation between the rotating shafts and the connecting shaft may take place simultaneously with otherwise high speed rotation of the entire assembly under engine load conditions.

In known systems of the type previously discussed above, the shifting sleeve is typically activated by a large piston which may be coaxially mounted relative to the shifting sleeve. This piston is moved in a first axial direction by a force created by application of pressurized engine oil as directed to one end of the piston by control of a solenoid operated valve. When the force produced by the pressurized oil is absent, a return spring typically biases the piston in a second opposite axial direction. Thus, the aforedescribed known mechanism basically produces a two-position timing or phasing function. This means that the system is not capable of selectively producing a stable, intermediate position between the first and second end positions of the piston. The inability to achieve such a stable intermediate position compromises optimal valve timing of an engine. If the aforedescribed system attempts to achieve an intermediate position, the return spring provided to bias and return the piston to the first position is subjected to cam torque impulse forces which undesirably produce unintended changes in the timing or phasing.

Secondly, undesirable consequences can result from the use of pressurized engine oil as the actuating force for operating the prior variable valve timing systems described above. The rotation of the two shafts, including the camshaft and the piston actuator, tends to act as a centrifuge with respect to the oil and resultantly separate solids in the oil from the remaining liquid portion. These solids can be deposited adjacent the periphery of the actuator piston and accumulate sufficiently to eventually interfere with the smooth reciprocal operation of the actuator piston. Furthermore, seals for containing the oil will wear and then the mechanism likely will develops either internal or external oil leaks. In addition, operation of this type of oil pressure actuated mechanism under cold conditions can be very sluggish due to the high viscosity of the oil.

Ideally, a compact variable timing device or mechanism that selectively provides infinite timing or phasing changes is sought. Such a mechanism would be desirable for timing an engine camshaft with respect to the engine's crankshaft for achieving a true variable valve timing system. The ideal mechanism would also be desirable for timing or phasing an input shaft of an engine distributing type fuel injection pump as is commonly used for diesel or other direct injection type engines, thus providing selectively timed fuel injection. In either application, what is needed is a shaft timing mechanism that can be either retarded or advanced relative to the crankshaft in a precise fashion in response to operating conditions of the engine.

SUMMARY OF THE DISCLOSURE

In accordance with one aspect of the invention, a selective timing or phase adjusting mechanism between one rotatable driving shaft and a driven output shaft, such as a camshaft, includes a drive member which is coaxially mounted and axially affixed with respect to the driving shaft for rotation together. An intermediate connecting member is coaxially mounted with respect to the rotatable driving shaft and the drive member and is capable of axial movement relative to both and angular motion with respect to either the driving shaft or drive member when conducting its relative axial movement. The intermediate connection and coupling member is connected to a geared device that is selectively activated by an electric motor which produces axial movement of the intermediate connection and coupling member with respect to the rotatable drive shaft and driving member to any desired axial position between predetermined first and second position. The gearing device provides a unidirectional drive system which allows the motor to drive the mechanism, providing the optimum shaft phasing, but protects against torque forces self exerted by the shaft from changing the desired shaft phasing.

Preferably, the gearing device is operably connected to a sleeve rotatably free with respect to said intermediate connection member and axially affixed relative thereto. The gearing device when in operation axially moves the sleeve which in turn axially moves the intermediate connection member with respect to both the driving member and the shaft.

The intermediate connection member is a axially shifting bar or shaft that has helical splines that rotationally affix the bar to either the driving member or the driving camshaft and allow relative rotation of the bar with respect to one of the driving member and the camshaft upon relative axial motion.

In one embodiment, the gearing device is a worm gear that axially drives the sleeve. In another embodiment, the gearing device is a threaded lead screw engaging complementary threads on the sleeve. In another embodiment, the gearing device is in part a gear sprocket that has an internally threaded hub that engages complementary external threads on the sleeve. The gear sprocket may engage a pinion gear connected to the output shaft of the electric motor.

In one embodiment, the rotatable camshaft is hollow and defines a hollow interior. The driving member is rotatably mounted proximate one end of said camshaft and the gearing device is mounted proximate a second end of the hollow rotatable shaft. The driving member is connected to the gearing device through the hollow interior of the rotatable shaft.

In one embodiment, the timing device is incorporated in a valve timing device for an internal combustion engine where the driving member is a cam gear or sprocket that is mounted on one end of the camshaft for angular rotation with respect thereto. In one embodiment, the intermediate connection member is a shifting bar that is at least partially mounted for axial sliding motion within the camshaft.

In one embodiment, the mechanism is disposed within a dedicated housing mounted between the timing drive train of a diesel engine and its fuel injection pump, thus providing optimized injection timing for correct operation of the diesel engine under all conditions of speed, load, temperature, etc.

It is desirable that the electric motor is operably connected to an electronic control unit that reads input parameters of the internal combustion engine and produces a motor controlling output signal to the electric motor in response to the input parameters to provide the optimum valve timing in accordance with the input parameters.

In this fashion, variable valve timing is achieved for any and all desirable parameters to achieve optimal valve timing. The variable timing is achieved in a variety of packages contours depending on the space availability about the camshaft and engine. The electric motor provides for precise and stable intermediate positions. The gearing between the electric motor and the cam or fuel pump locks the position against any torque forces that may be exerted by the input driving member or reverse torques exerted onto the output shaft i.e. camshaft.

In addition to the variable valve timing achieved by the mechanism as described above, the same mechanism is available to drive a fuel injection pump. This application would allow the fuel injection timing to be varied corresponding to similar engine parameters and characteristics.

BRIEF DESCRIPTION OF THE DRAWINGS

Reference now is made to the accompanying drawings in which.

DETAILED DESCRIPTION OF THE PREFERRED EMBODIMENT

Figure 1:
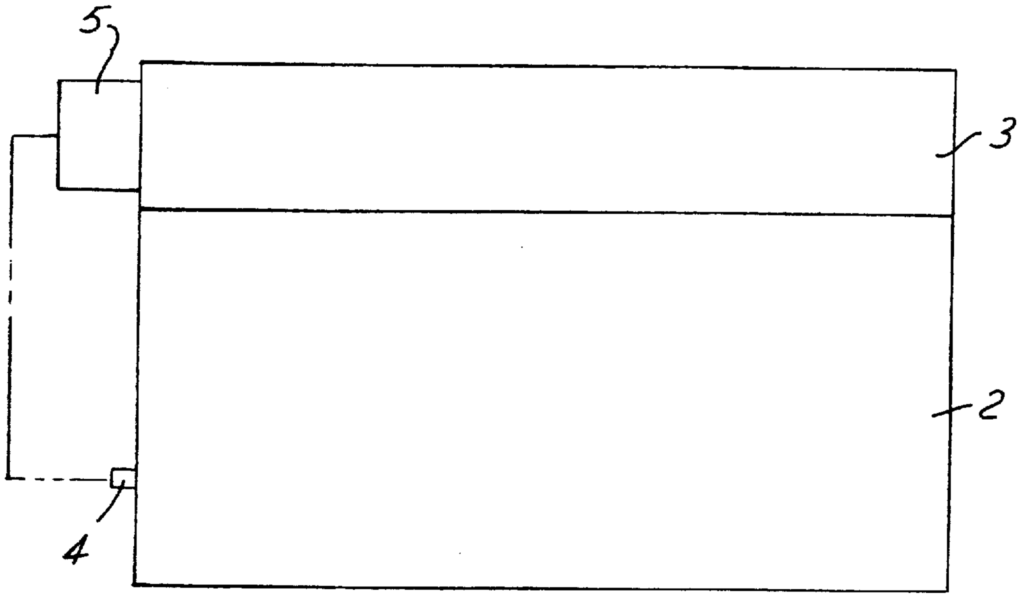
FIG. 1 is a schematic representation of the subject mechanism as applied to variable valve timing for an engine camshaft driven by the engine crankshaft.
Figure 2:
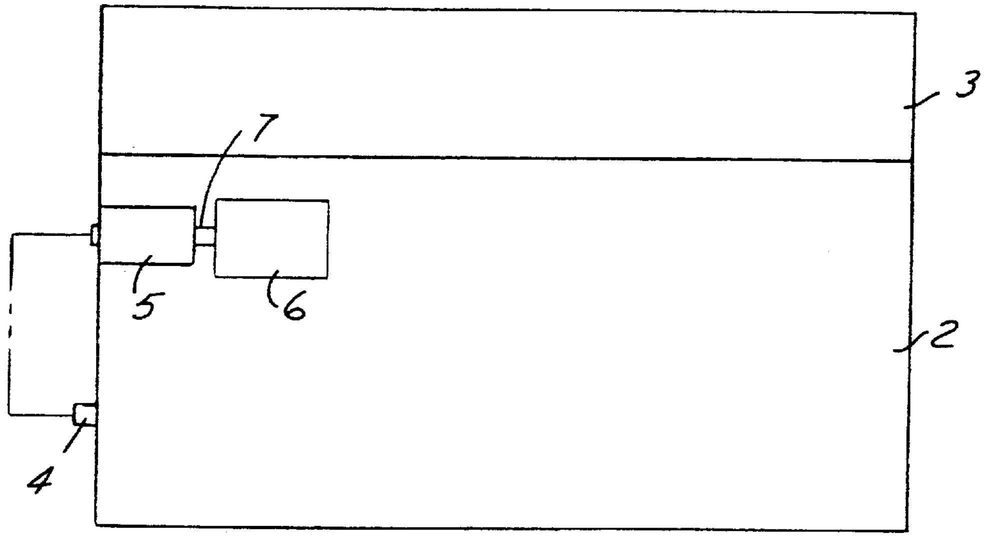
FIG. 2 is a schematic representation of the subject mechanism as applied to variable fuel injection timing for a fuel pump driven by the engine crankshaft for directing fuel to specific combustion chambers in timed sequence.

In FIGS. 1 and 2, an internal combustion engine 1 is schematically illustrated in block form. Engine 1 has an engine block portion 2 and a cylinder head 3. Block 2 and cylinder head 3 are attached together in a manner well known in the engine art. A projecting end portion 4 of a crankshaft is shown in FIGS. 1 and 2.

In FIG. 1, the selective rotary adjusting mechanism 5 is shown being used for providing selective variable camshaft timing or phasing of the engine camshaft relative to the engine crankshaft. Mechanism 5 basically transfers rotary motion of the crankshaft to the camshaft which is mounted for rotation on the cylinder head and covered by a valve cover attached to the cylinder head (not shown in FIGS. 1 and 2). Specifically, rotary motion from the end 4 of the crankshaft is transmitted to the mechanism 5 by gearing, a belt drive, or by a chain drive (no specific means is shown except schematically). All of these transmittal devices are well known in the engine art. The exact operation working of the mechanism 5 will be detailed hereinafter.

In FIG. 2, the rotary adjusting mechanism 5 is shown being used for providing selective variable fuel injection timing for a rotary fuel pump 6. This particular type of fuel pump is commonly used for a diesel engine and in addition to pressurizing and pumping fuel it also distributes a quantity of fuel to each combustion chamber in a sequence controlled by rotation of the crankshaft. As is shown in FIG. 1 and explained previously, the engine crankshaft 4 and the mechanism 5 are operably connected for rotation together. Also, the fuel pump 6 is connected by a shaft 7 to the mechanism 5 for rotation together. Fuel inlet or outlet conduits are not shown in FIGS. 1 and 2 but would be used and would extend from a vehicle fuel tank to the pump and from the pump to the various combustion chambers of the engine.

It should be understood that either of the two applications of mechanism 5 or both applications might be used as suggested in FIGS. 1 and 2.

First Embodiment

Figure 3:
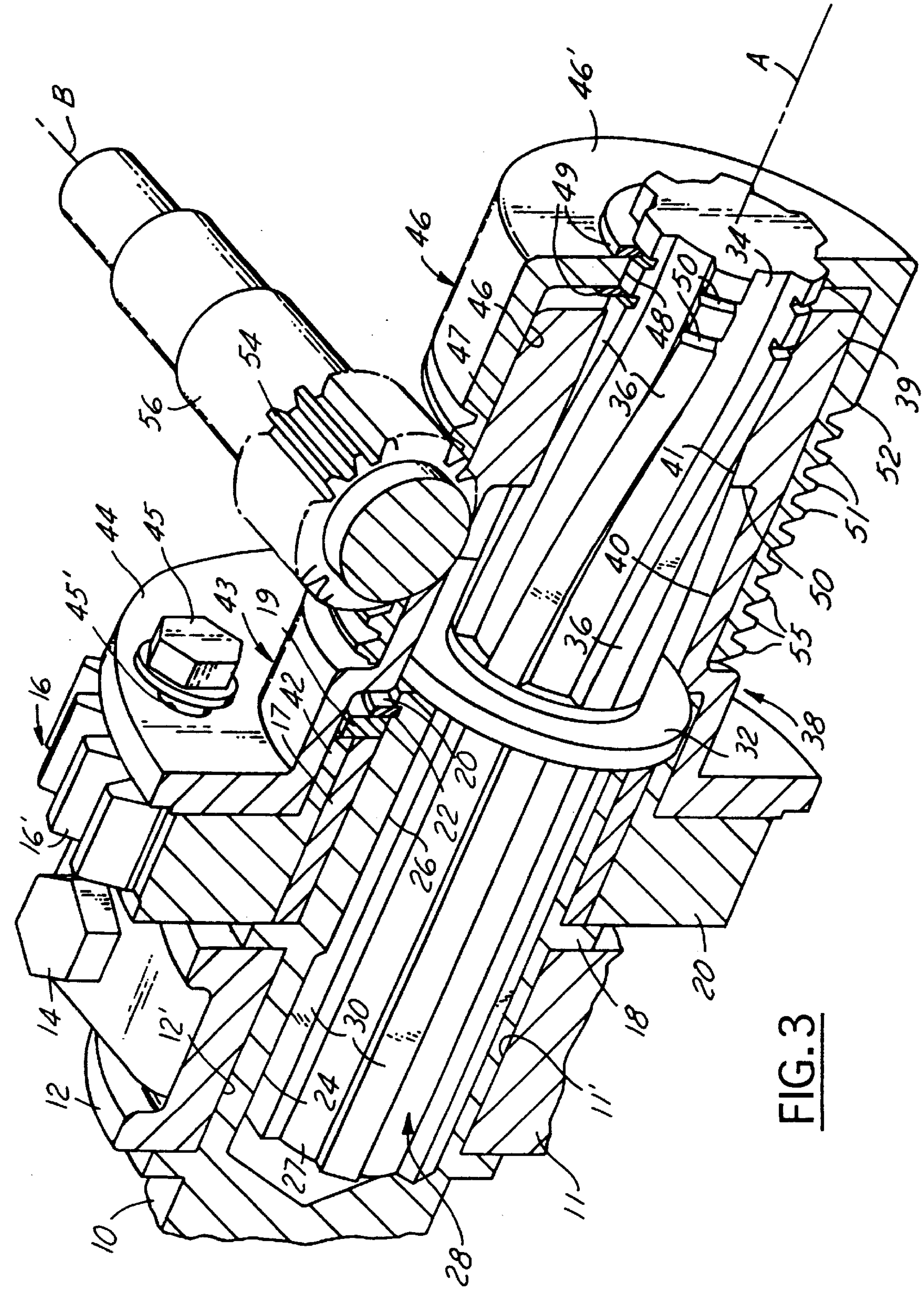
FIG. 3 is a perspective and partially broken away and vertically sectioned view as created by a vertical plane extending through axis A as along section line 3—3 in FIG. 4 of one embodiment of a selective variable timing or phasing mechanism for engine valving.
Figure 4:
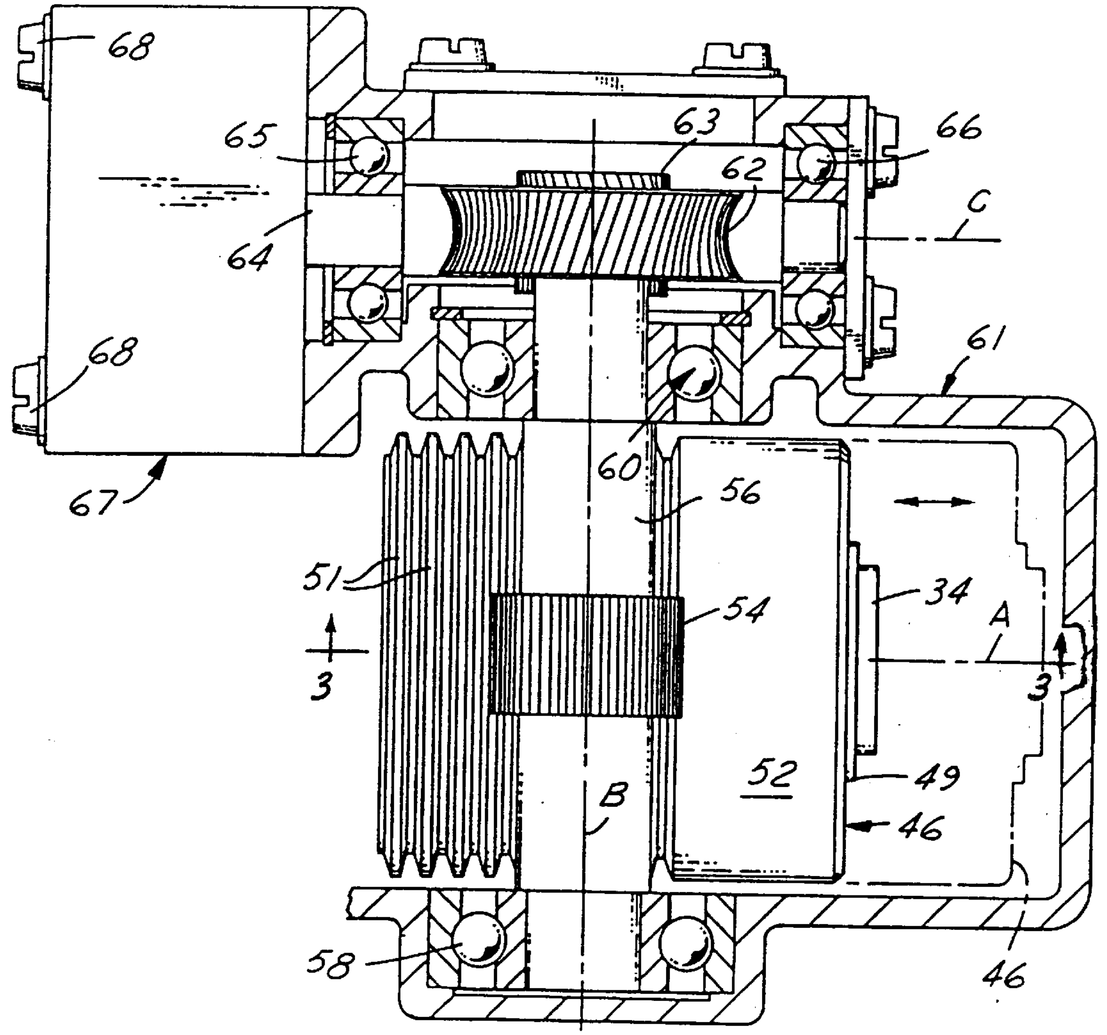
FIG. 4 is fragmentary and top plan, partially sectioned view of the one embodiment and illustrating an electric motor and gear mechanism for producing timing changes between the engine crankshaft and camshaft and illustrating a shifting sleeve member in alternate extreme positions.

Referring now to FIGS. 3 and 4, a first embodiment of the invention is shown as it is applied to an application for a selective variable valve timing. The application utilizes a chain or a gear-driven transmission between the crankshaft and the camshaft of an associated internal combustion engine as will be apparent from the following description. It should be understood that the invention is also useful for many other similar selective timing and phasing application such as a diesel fuel injection pump in which it is desired to change the phase relation between the output of a rotary driving shaft and a rotary driven shaft, either advancing or retarding the driven shaft with respect to the driving shaft.

FIG. 3 illustrates the forward end portion 10 of the driven camshaft of an associated engine which is supported for rotation on a front bearing assembly of the saddle type including a semi-cylindrical bearing surface 11' formed in an upstanding portion 11 of the engine's cylinder head 3. The end 10 of the camshaft is retained against bearing surface 11' by a bearing cap member 12 defining a semi-cylindrical bearing surface 12'. Cap member 12 is secured to the upstanding cylinder head portion 11 by fasteners 14 Only one of two shown).

The camshaft is driven by rotation of a camshaft input gear 16 having a plurality of teeth 16'. Gear 16 itself is adapted to be engaged by another gear (not shown) which would be operationally engaged or caused to rotate along with the engine crankshaft. Alternately, it should be understood that the member 16 could be configured to be engaged by a chain which would partially encircle it as well as also engaging a sprocket preferably on the engine crankshaft.

In the preferred embodiment shown in FIG. 3, the gear 16 encircles a cylindrical bearing sleeve 17 located about an outer cylindrical surface of the forward end portion 10 of the camshaft. The gear 16 and bearing sleeve 17 are secured from movement axially by a thrust shoulder 18 which is integrally formed on the end portion 10 of the camshaft and by a washer 19 retained on camshaft end 10 by a snap ring 20 within a groove 22. Located radially inward from gear 16 and sleeve 17 is an end bore forming a cavity 24 in the end portion of the camshaft. A portion of the internal, cylindrical wall surface of the cavity 24 is configured with a series or set of straight, internal splines 26.

As seen in FIG. 3, the leftward or inboard end portion 27 of a shifting stub shaft 28 extends into an end cavity 24 formed within the end of the camshaft. This inboard end portion 27 carries a series or set of external, straight splines 30 thereon which are complementary to the internal, straight splines 26 presented by a portion of the internal wall of the camshaft end 10. The series of splines 26 and splines 30 are adapted to mesh together causing both shafts to rotate with one another. The engaged series of splines 26 and 30 also allow the stub shaft 28 to move in an axial direction relative to the camshaft end 10 without changing the relative angular relationship between camshaft and stub shaft. Stub shaft 28 has a radially outwardly projecting collar stop 32 which engages the end surface of the camshaft end portion 10 when the stub shaft 28 is in its extreme leftward axial position which is shown in FIG. 3. This establishes the furthest axial leftward movement of stub shaft 28. The collar stop 32 may be integrally formed on shaft 28 or be separately formed and welded thereon. The rightward or outboard end portion 34 of stub shaft 30 has a series of external, helical splines 36 formed thereon.

A hub member 38 having a generally tubular rightward or outboard end portion 39 defining an internal cylindrical aperture 40 is mounted about the outboard end portion 34 of the stub shaft 28. The configuration of the internal cylindrical aperture 40 is adapted to accommodate the sliding movement of the stop collar 32 axially therethrough. The outboard end portion 34 of member 38 has a set or series of internal helical splines 41 which are complementary to the set or series of external splines 36 formed in outboard end portion 34 of the stub shaft 28. The two series of splines 36, 41 permit slidable axial movements of the stub shaft 28 relative to the hub member 38. Because of the helical nature of the series of splines, the axial movement between members 28 and 38 results in a change in their angular timing or phase relationship.

An enlarge internal aperture part of the leftward or inboard end portion 43 of the hub member 38 concentrically encircles a shoulder portion 42 of the input or driving gear member 16 and further has a substantial radially outwardly extending flange portion 44. The flange portion 44 overlies and engages a side surface of gear member 20 as shown and is secured thereto by a plurality of circumferentially spaced bolts 45 (only one of which is shown). Each of the bolts 45 extends through a circumferentially extending slot 45'. Conventional lock washers inhibit loosening rotation of the bolts 45 as shown in FIG. 3. The circumferentially extending slots obviously permit a wide degree of angular adjustment between the members 16 and 38.

A generally cup-shaped drive sleeve member 46 has a cylindrical configuration with a closed end portion 46' and an interior defined by an interior wall or surface 46" permitting it to be positioned about the outside surface 47 of the hub member's end portion 39. The end portion 46' is configured with a series of internal, helical splines 48 adapted to slidably engage the corresponding external, helical splines 36 on the outboard end portion 34 of the stub shaft 28. The end portion 46' of the drive sleeve 46 is axially connected to the end portion 34 of the stub shaft 28 by a pair of snap rings 49 seated in a respective grooves 50 formed in the outboard end 34 of the stub shaft 28.

The axial fixation of the drive sleeve 46 to the shifting stub shaft by the snap rings 49 enables the drive sleeve 46 to cause movement of the shifting stub shaft 28 in an axial direction relative to the axially stationary camshaft 10 and hub member 38 as permitted by the limits applied by the accommodation of the stop collar 32 within aperture 40 of hub member 38. The possible axial movement is better understood by reference to FIG. 4 which shows the two extreme positions of the drive sleeve 46 as well as stub shaft 28 (note the projecting rightward or outboard end). Again, at one extreme, the stop collar 32 abuts the end surface of the camshaft 10 and at the other extreme position the stop collar 32 engages an internal shoulder stop 50 machined within the hub member 38. Obviously, the surfaces defined by the outside diameter 47 of the flanged hub member 38 and the inside diameter 46" of the drive sleeve 46 must be accurately formed and sufficiently finished to allow both sliding movement between members and the desired small degree of relative angular rotation resulting from the helical nature of spline series 36 and 41. It is also important to maintain a sufficient degree of concentricity to provide smooth operation.

As best shown in FIGS. 3 and 4, a series of circumferentially continuous and axially spaced tooth formations 51 formed are formed on the external cylindrical surface 52 of the drive sleeve 46. This provides the rack-like formation in a known rack and pinion type gear arrangement. Each of the tooth configurations has a gear-shaped profile. The teeth 51 extend parallel to one another axially along the drive sleeve member 46 and are engaged by similarly profiled teeth of a pinion gear 54 on a shaft 56 with an axis "B" extending transversely to the axis "A" of the mechanism discussed above.

The mechanism as illustrated in FIG. 4 shows a top planar view of the mechanism as compared to the side view shown in FIG. 3. In addition, housing structure is added to show how shaft 56 with its pinion gear 54 is mounted at opposite ends by a pair of ball bearing assemblies 58 and 60. The bearing assemblies 58, 60 are supported by a cover housing 61 within which the mechanism operates. A bull gear 62 of a worm-gear drive is attached to the upper end of the shaft 56 as shown in FIG. 4. Bull gear 62 meshes with a lower worm pinion gear 63 which is mounted on a midportion of a shaft 64. Shaft 64 is mounted for rotation by two ball bearing assemblies 65, 66 which are supported by housing 61. The axis "C" of the shaft 64 driving the worm gear pinion 63 lies in a plane parallel to axis "A" of the mechanism best detailed in FIG. 3.

Shaft 64 is operably attached to a variable phased drive motor (reversible D.C. stepper motor 67 which is suitably attached to the cover housing 61 by screws 68. The output shaft 64 is either directly connected to the worm pinion gear 63, as shown, or operably indirectly through an integral reduction gear (not shown).

Figure 5:
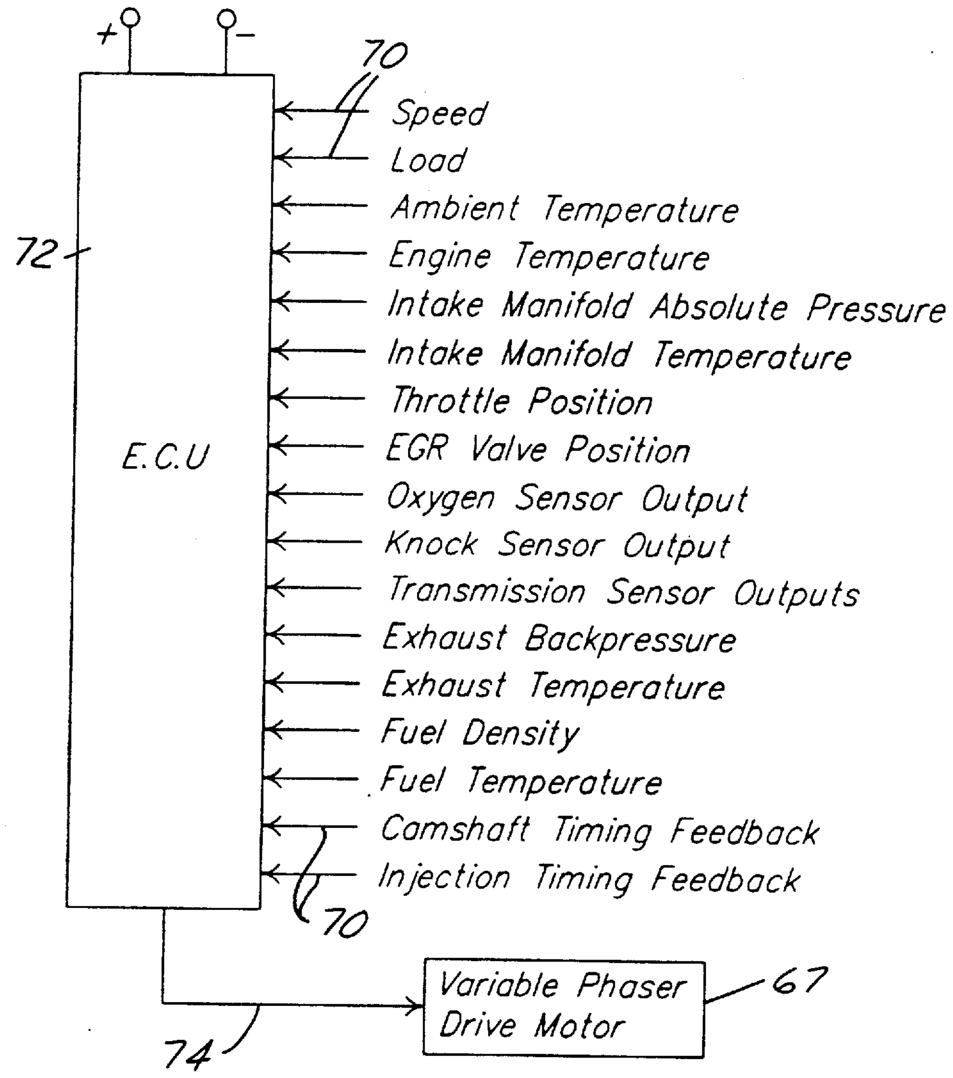
FIG. 5 is a graphical representation of an electronic control system for the camshaft variable timing system shown in FIGS. 3 and 4.

The selective phase adjusting mechanism illustrated and described above can be advantageously utilized to control timing or phasing of the camshaft of an internal combustion engine relative to rotation of the crankshaft. In most engines, the timing or phase relationship between camshaft and crankshaft is set and is not adjustable. However, various engine related operational conditions or parameters, such as speed, load, temperature or other operative factors, are functional factors that together relate to an ideal timing or phasing of the camshaft relative to the camshaft. Many of the same factors are already included as control parameters for ignition timing or for fuel injector operation on modern electronically-controlled engines. The parameters or factors, labeled 68 in FIG. 5 are sensed by various devices (not shown) and inputted as signals 70 to an electronic control unit 72 (ECU). The ECU is preferably the same unit controlling the other engine functions (injector operation, spark or injection timing, E.G.R. rate, etc.). The ECU 72 produces as appropriate desirable output control signal 74 in the form of an appropriate number of control pulses, which are fed to the stepper motor 67. The motor 67 responds by producing a discrete planned rotation of its shaft 64 resultantly operating its mechanical gearing, including worm pinion gear 63, worm gear 62, pinion gear 54, and rotary rack teeth 51. This changes the axial positioning of the drive sleeve 46 and attached shifting stub shaft 28. Thus, the shifting stub shaft is axially moved in proportion to the number of pulse signals from the ECU 72 for achieving the desired angular phasing of the camshaft 10 relative to the drive input (gear 16). The computer or ECU 72 keeps track of the number of pulses fed to the stepper motor 67 and retains in its memory the exact angular rotation of its output shaft. Thus, the total relative phasing of the camshaft 10 with respect to the input gear 20 is known to the ECU such that no position feed-back device or data is needed by the ECU.

An alternative drive for stepper motor 67 would be a regular reversing D.C. motor. However, in this case, a position feedback signal would be required for the ECU to properly locate the sleeve 50 following a pre-programmed computer algorithm. A feedback signal can be generated by a multitude of easily available sensors (not shown), including for example a linear variable differential transformer (LVDT) attached to drive sleeve 50 to monitor its axial position. Other examples might include a linear potentiometer to perform the same function, or a rotary potentiometer to monitor the number of turns of the pinion shaft 56 or worm pinion shaft 64.

The rotary teeth 51 formed on drive 51 formed on drive sleeve 46 could be replaced by a non-rotating linear rack attached to the exterior surface 52 if the connection of the drive sleeve 46 to the shifting stub shaft 28 is through a bushing member or a ball bearing coupling (not shown). Furthermore, the spline sets on the camshaft 10, the shifting stub shaft 28, the hub member 38, and the drive sleeve 46 could be replaced by appropriate spherical or cylindrical rollers fitted within appropriately shaped grooves in the respective members.

Figure 6:
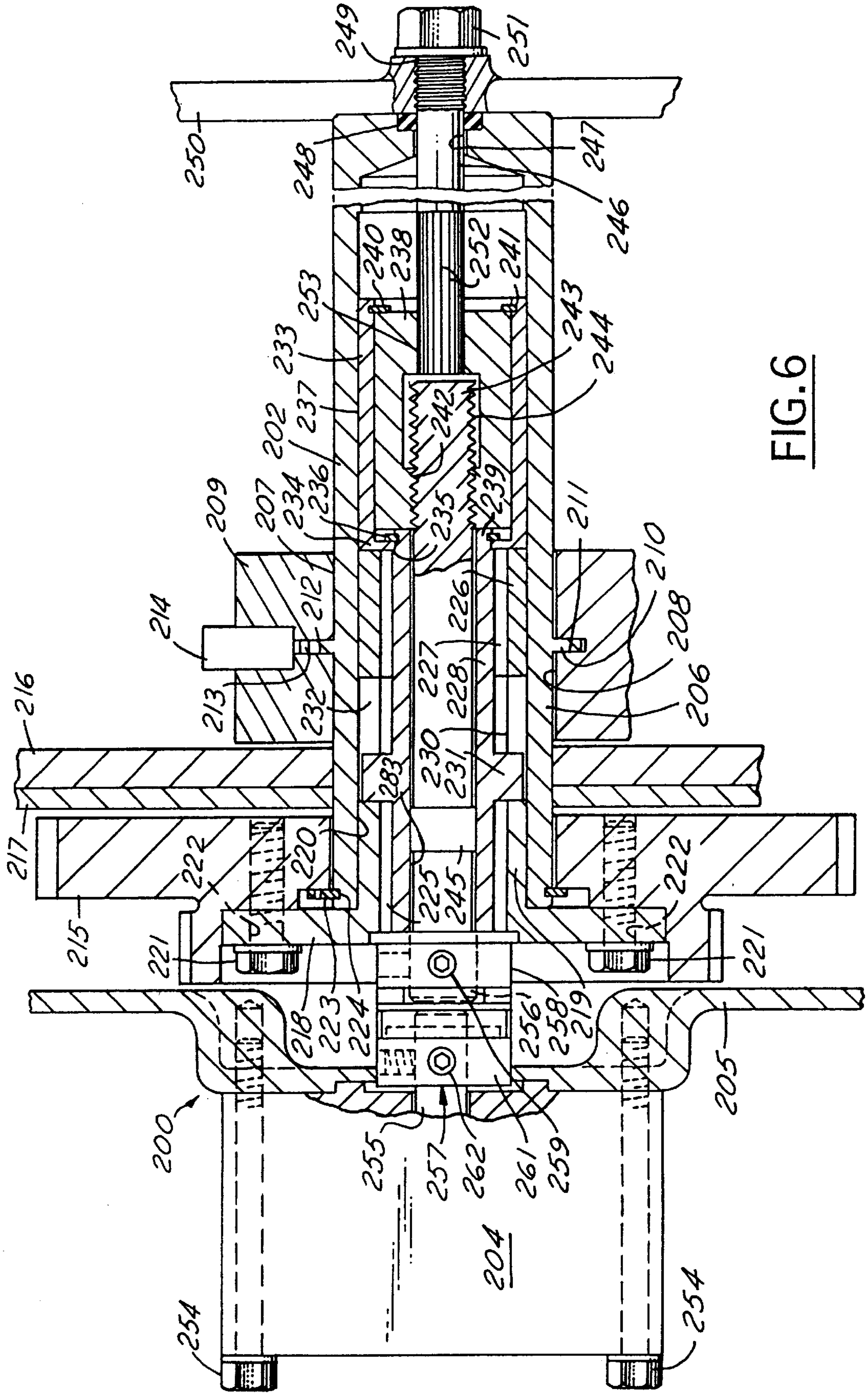
FIG. 6 is an elevational and partially sectioned side view of a second embodiment of the subject invention.

In FIG. 6, a second embodiment of the selective adjustable timing or phasing mechanism is illustrated as applied to controlling camshaft timing or phasing. This particular timing mechanism 200 is designed for mounted inside a typical 40 mm diameter of an intake camshaft 202. Such a camshaft would be appropriate for use with a four-valve, double overhead camshaft diesel engine such as used in trucks, for example. The adjustable phasing mechanism 200 is driven directly by an external reversible stepper motor 204 which is mounted forward of the front end of camshaft 202, and exteriorly to a cover plate 205. The camshaft 202 includes a front or outboard end portion 206 with a camshaft journal 207 which is supported for rotation by a semicylindrical journal portion 208 formed in the cylinder head and a bearing cap 209. Axial movement of the camshaft 202 is prevented by including a thrust shoulder 210 disposed in the center of the journal 207. Shoulder 210 extends into a grooves 211, 212 formed respectively in the cylinder head and bearing cap 209.

One or more notches or teeth 213 may be machined on the peripheral edge of the thrust shoulder 208. A magnetic sensor pick-up 214 may be mounted on the bearing cap 209 radially outwardly from sensor 214. The sensor 214 is connected to an ECU through proper electrical connections (not shown).

A driving gear 215 is rotated by the rotative operation of the engine's crankshaft which has a driven gear (not shown) attached thereto which is operatively connected to the driving gear 215 in a conventional manner known in the engine art. The driving gear 215 is positioned adjacent a front or outboard face 216 of the engine cylinder head. At either side of the gear 215 are portions of the cover plate 205 and a timing gear housing or case 217. Members 205 and 217 are attached to the wall portion 216 of the cylinder head by conventional fasteners (not shown). The driving gear 215 is mounted concentrically about the end portion 206 of the camshaft 202. A flange portion 218 of a bushing extends adjacent the side surface of the gear 215 and a pilot shoulder portion 219 of the bushing is positioned within an interior bore 220 formed in the end of the camshaft. The flange 218 is attached to the driving gear 215 by a plurality of cap screws 221 which are inserted through circumferential slots 222 in the flange 218. The cap screws 220 are inhibited from loosening rotation by conventional lock washers.

The driving gear 215 is prevented form leftward axial movement on the end 206 of the camshaft by a snap ring 223 which is disposed in a groove 224 formed in the camshaft's end portion 206. The cap screws draw the flange 218 against the end surface of the camshaft end portion 206 to prevent rightward axial movement of the connected flanged bushing and driving gear 215. In addition, a set or series of internal straight splines 225 is formed along the interior diameter of the pilot shoulder portion 219 of the flanged bushing.

In addition to the pilot shoulder 219 of the bushing located within the camshaft's interior bore 220, another bushing member 226 is also mounted therein. Specifically, a bushing member 226 is mounted therein preferably by shrink fitting or press fitting it so that the bushing and the camshaft are substantially integral. The bushing 226 is formed with a set or series of integral helical splines 227 along its inside diameter. An axially shifting hollow sleeve member 228 is located within the interior bore 220 of the camshaft and between the one set of internal straight splines 225 and the other set of internal helical spline 227. Shifting sleeve member 228 has a first set or series of external straight splines 229 and a second set or series of external helical splines 230 respectively engaging the series of internal straight splines 225 of member 219 and the series of internal helical splines 227 of member 226. A radially outwardly extending stop shoulder of flange 231 is formed on the midposition of the shifting hollow sleeve member 228. The shoulder 231 shifts axially with the sleeve member 228 and slides in an axial direction within an annular space 232 limited at its ends by the bushings 219 and 226.

In FIG. 6, the inboard or rightward end portion of the shifting sleeve member 228 is connected to a leftward end portion of a carrier sleeve member 233. Specifically, a radially inwardly directed annulus or shoulder 234 of sleeve member 233 terminates at an inward edge 235 which encircles the rightward end portion of the sleeve member 228. The shifting sleeve member 228 carries a snap ring 236 which is firmly mounted in a groove in the rightward end of member 228. Engagement of the shoulder 234 and its edge 235 with the snap ring 236 linkingly connects sleeve members 228 and 233 for mutual axial movements together while permitting relative rotational movement therebetween. Thus, the carrier sleeve 233 is free to rotate with respect to the shifting sleeve 228. Alternatively, the sleeve members could be secured together by matching internal splines (not shown).

The carrier sleeve 233 is mounted within the internal bore 220 of the camshaft. More specifically, an outside surface 237 of the sleeve 233 is slidable against the internal diameter surface of the camshaft's bore 220 which acts as a guide-bearing surface.

A nut member 238 with a cylindrical exterior configuration is disposed within correspondingly configured interior formed in the carrier sleeve 223. The nut member 238 is free to rotate within the sleeve but is restrained axially by engagement at one end with the end 239 of the shifting sleeve 228 and by engagement at the opposite end with a snap ring 240 which seats in a groove 241 located at the rightward or inboard end portion of carrier sleeve 223. The nut member 238 has a threaded bore 242 formed through the leftward or outboard end portion. Preferably, the threaded bore has an acme type thread configuration. A jack shaft 243 extends through the nut member 238 and also carries acme screw threads 244 which are formed on the outer cylindrical surface at the rightward or inboard end of the jack shaft. The unthreaded leftward portion of the jack shaft 243 extends into the interior of the shifting sleeve member 228. Shaft 243 has an enlarged end portion 245 which engages the encircling wall of the sleeve member for providing an accurately guided but relatively frictionless movement between the members 228 and 243.

A quill-shaft 246 extends coaxially within the camshaft with an end portion which extends through an aperture 247 in the camshaft's rightward end. Oil leakage from the camshaft interior is blocked by a seal member 248 carried by the camshaft and encircling the quill-shaft 246. The quill-shaft 246 is retained by engagement of a threaded shank portion 249 of the 246 with corresponding threads formed in a rear wall portion 250 of the cylinder head. A head portion 251 is engaged to rotate the quill-shaft 246 and consequently tighten the shaft relative to the cylinder head's rearwall 250. A soft copper washer, or other such similar function device, is inserted under the head portion 251 to inhibit any oil leakage.

Accordingly, the quill-shaft 246 is secured in a stationary and non-rotating posture. A set or series of straight exterior splines 252 are formed on the leftward or outboard portion of the quill-shaft 246 and a corresponding set or series of internal straight splines 253 are formed in the rightward or inboard end of the nut member 238. The two series of splines 252, 253 prevent rotation of the nut member 238 but permits axial movement with the carrier sleeve 233 and linked shifting sleeve 228.

The previously identified reversible stepper motor 204 is mounted at the forward end of the engine to the cover plate member 205 by a plurality of cap screws 254 (only two are shown). The motor has a drive shaft 255 which engages the leftward or outboard end 256 of the jack shaft 243 through an Oldham coupling 257 or its functional equivalent. The rear or inboard half-portion 258 of the Oldham coupling is secured to the jack shaft 243 by set screws 259 (only one of which is shown). A collar or flange 260 on the inboard half-portion 258 of the Oldham coupling 257 establishes the axial positioning of the jack shaft 243. The Oldham coupling 257 also has a forward or outboard-half 261 which is securely attached to the motor shaft 255 by set screws 262 (only one of which is shown).

For some engine applications with particular packaging requirements, it may be undesirable to mount the stepper motor 204 on the forward portion of the engine, as shown. When there is room at the rear portion of the engine, it would be simple to reverse the aforedescribed mechanism and install the motor on the rear of the engine.

In operation, the reversible stepper motor 204 responds to output pulse signals from the ECU of FIG. 5 and rotates a desired selective amount in either direction. The degree of motor rotation in response to the ECU pulses are counted or remembered by the ECU. In other words, the ECU has a memory on low many degrees, either way, the motor has turned. Alternatively, a common reversible D.C. motor could be used, but in this case, it would be necessary for provision of supplying the ECU with data on the camshaft position (feed back). This could be accomplished by the reaction of the magnetic sensor 214 to one or more notches 213 on the periphery of the thrust flange 210. By comparing the angular position of the notch or notches 213 to the angular position of the engine crankshaft, sensed by a similar magnetic pick-up, the ECU can determine the angular position of the camshaft and make corrections. The rotation of the motor's shaft 255 turns the jack shaft 243. Since the nut member 238 cannot turn because of the action of the stationary quill-shaft 246, the nut member 238 is moved in an axial direction. Movement of the nut member 238 simultaneously moves the carrier sleeve 233 in the same axial direction. The movement of carrier sleeve 233 causes the linked shifting sleeve 228 to be moved in the axial direction. Therefore, we see that for any rotation of shaft 255, a corresponding axial movement is produced for the members 238, 233, 228. Because of the differential angular effect between the set of helical splines 227 and 230, the aforedescribed axial movement of the shifting sleeve 228 causes a change in phase relationship between the drive through gear 215 and the driven camshaft bushing 226 and camshaft 202. Accordingly, this causes the phasing or timing of the camshaft to be selectively changed with respect to the rotation of the engine crankshaft. The elongated slots 222 in the flanged bushing provide a means for adjusting the phase of the camshaft with respect to the crankshaft in the initial phase of the camshaft with respect to the crankshaft in the initial engine set-up.

Figure 7:
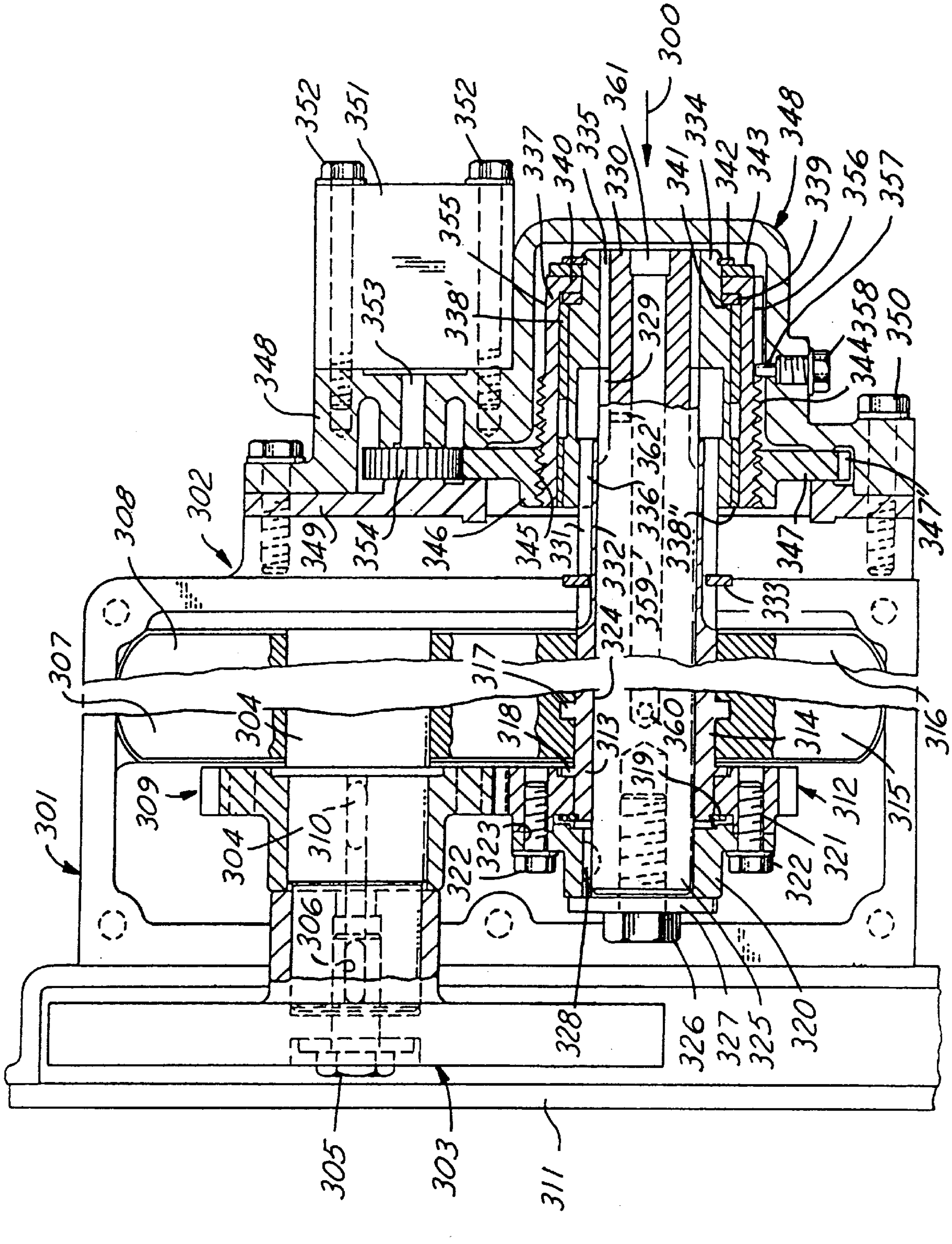
FIG. 7 is a side view of a third embodiment of the invention and partially sectioned along a vertical plane.

In some instances, it may be desirable to install the entire variable timing mechanism at the rear of the engine opposite the driven end. Such a mechanism can either be driven directly by an electric motor as shown or through a gear-train. Since the first two embodiments involved a direct-drive mechanism and a worm-drive system, a third embodiment 300 is illustrated in FIG. 7. The mechanism 300 is located at the rear portion of the engine and the camshaft. In particular, the mechanism is designated for a camshaft with a 30 mm diameter useful in a four-valve double overhead camshaft (DOHC) engine of relatively small displacement, such as a 550 cc per cylinder engine (a four cylinder 2.2 L engine).

On the left in FIG. 7, a camshaft drive mechanism for an engine's valve train is illustrated including a forward portion 301 of an engine's cylinder head shown to the left. The rearward portion 302 of the cylinder head is illustrated to the right. The drive input of valve train mechanism from the crankshaft includes a drive sprocket assembly 303 such as could be rotated by a belt (not shown) which in turn is driven by a sprocket on the engine crankshaft (not shown). The sprocket assembly is attached to the forward end portion of an exhaust camshaft 304 by a bolt fastener 305. Relative rotation between the sprocket and camshaft is prevented by a keyway connector 306 located therebetween. The forward or leftward end portion of the exhaust camshaft 304 is supported for rotation by a bearing assembly 307. Likewise, the rearward or rightward end portion of the intake camshaft 304 is supported for rotation by another bearing assembly 308.

The forward end portion of the exhaust camshaft 304 carries a driving gear 309 which is secured thereto for rotation with the camshaft 304 by a keyway connector 310. The sprocket assembly 303 is located in a depressed space formed by the forward wall of the cylinder head and it is enclosed by a cover plate 311.

The driving gear 309 carried by the exhaust camshaft 304 meshes with a second driven gear 312. A forward portion 313 of a intake camshaft 314 is supported for rotation by a bearing assembly 315. Likewise, the rearward or rightward end portion of the intake camshaft 314 is supported for rotation by another bearing assembly 316. Axial movement of the camshaft 314 is prevented by formation of a thrust flange 317 on the camshaft's end portion 313. The thrust flange 317 is captured in a annular groove formed in cylinder head and bearing.

The driven gear 312 is supported on the end portion 313 of the camshaft and is fixed in the axial direction on the right by a shoulder 318 formed on camshaft 314 and on the left by a snap ring 319 mounted in a groove formed in camshaft end portion 313. Accordingly, this arrangement permits gear 312 to rotate about the end 313 of the camshaft 314 although as we will see, there is little relative rotation therebetween. What rotation that does occur takes place only during a period when the phasing or timing of the camshaft is being adjusted.

A flanged bushing member 320 is located to the left or forward or gear 312 and is centered by a slight shoulder 321 extending from the face side of the gear 312. The bushing 320 is securely attached to the gear 312 by a plurality of cap screws 322. Each cap screw 322 is inserted through a circumferentially extending slot 323 in the flange member 320. These permit a degree of relative angular adjustment between gear 312 and flange 321 during an initial engine set-up. The cap screws 322 are inhibited from any loosening rotation by lock washers or similar devices.

The intake camshaft 314 is tubular and has an inner bore 324 which extends axially therethrough. An elongated quill-shaft 235 extends through the inner bore 324 and past the rightward end portion of the camshaft. Quill-shaft 325 has a threaded aperture formed in its leftward end which is engaged by a bolt fastener 326. A relatively large diameter washer 327 is secured to the end of the quill-shaft 325 with its outward peripheral edge pressed against the end of the flanged bushing 320. A woodruff key connector 328 between the flanged bushing 320 and the quill-shaft 325 prevents rotation between members 320, 325. Accordingly, the gear 312, flanged member 320, and quill-shaft 325 are connected to rotate together as a unit in response to rotative input from the engine crankshaft.

The rightward end of the quill-shaft 325 has a set or series of external, axially straight splines 329 formed thereon. A second set or series of external, but helically extending splines 331 are formed on the rightward or rearward end portion 332 of the camshaft 314. The rightward end portion of the camshaft 314 carries a stop washer 333 which has a set of internal splines formed thereon engaging the set of splines 331 of the camshaft. Stop washer 333 is axially fixed upon the camshaft 314.

To the right of the end of the camshaft 314, a shifting sleeve member 334 with an interior space is disposed about the rightward end portion 330 of the quill-shaft 225. The shifting sleeve member 334 has a first set or series of internal, axially straight splines 335 and a second set or series of internal, helically directed splines 336 formed on its interior surfaces. The first series of internal, straight splines 334 correspond to and engage the series of external, straight splines 329 formed on the quill-shaft 325. The series of internal, helical splines 336 on the shifting sleeve 334 correspond to and engage the series of external, helical splines 331 on the camshaft 314.

It should be noted that the straight sets of splines 329, 335 could be formed as helical splines and the helical sets of splines 331, 336 could be formed as straight splines. Further, all the splines could be helical with a different angle formed between set 329, 336 and set 331, 336.

A generally cup-shaped carrier sleeve 337 extends coaxially about the shifting sleeve member 334. Bushings 338' and 338" are inserted therebetween. A thrust washer 339 is disposed about the shifting sleeve member 334 between a shouldered end 340 of the carrier sleeve 337 and a shoulder 341 of the shifting sleeve member 334. The bushings 338', 338", and thrust washer 339 facilitates relative rotational movement between the shifting sleeve member 334 and the carrier sleeve member 337 with relatively little friction and wear. A snap ring 342 fitted into a groove formed in the rightward end of the shifting sleeve member 334 secures together both the shifting sleeve member 334 and the carrier sleeve member 337 for axial movement as a unit while permitting relative rotation therebetween. In the preferred embodiment, a thrust washer 343 is positioned between the snap ring 342 and the shouldered end 340 of the carrier sleeve member 337.

In FIG. 7, numeral 344 identifies a threaded exterior surface formed on the end of carrier sleeve 337. The threaded portion 344 is engaged by a similarly threaded interior bore 345 of a hub 346 encircling carrier member 337. The hub 346 is central to a spur gear 347 having gear teeth 347' formed along its circumference. The threaded engagement between portions 344, 345 causes the carrier sleeve 337, and shifting sleeve 334 to move in an axial direction as the spur gear 347 is rotated but restrained axially. The axial extent of the threaded portion 344 on member 337 must be sufficient to permit the desired degree of axial movement for members 334 and 337.

The members 334, 337, and 347 are housed within an enclosure formed by a housing member 348 and a base member 349. Members 348, 349 are positioned adjacent the leftward end 302 of the cylinder head. Both housing 348 and base member 349 are attached to the rear end of the cylinder head position 302 by cap screws 350 (two of which are shown). Portions of housing 348 and base 349 engage opposite side surfaces of gear 347 to sandwich it for the purpose of retaining it in axial directions while permitting the gear to rotate.

An electrical stepper type motor 351 is attached to the housing 349 by cap screws 352 (two of which are shown). The motor 351 is activated under the control of the ECU 72 which is shown in FIG. 5. The ECU 72 activates motor 351 whenever a change in the camshaft timing or phasing relative to the crankshaft rotation is desired. A rotatable shaft 353 of the stepper motor 351 carries a pinion gear 354 which engages the teeth 347' of the spur gear 347. Activation of the motor 351 causes a rotation of shaft 353 and pinion gear 354.

This in turn rotates spur gear 347. Since the spur gear 347 is fixed in the axial direction between housing 348 and base 349, its rotation produces axial movement of the carrier sleeve member 337 through the threaded portions 344 and 345.

An axially extending groove 356 is formed in the exterior surface 355 of the carrier sleeve 337. An appropriately shaped and sized stationary pin 357 is carried by a set screw 358 and extends into groove 356. This prevents rotation of the carrier sleeve member 337 but permits it to move in an axial direction. Also, due to snap ring 342, any axial movement of the carrier sleeve member 337 produces the same axial movement of the shifting sleeve member 334.

Lubrication of the selective adjusting spline mechanisms is provided through drilled passages 359 extending from an oil feed 360 from the front cam bearing 315. An end cap 361 plugs the through bore which forms the passage 359. A small feed bore 362, one of several, feeds oil to the splines 329. The oil is allowed to drain back into interior of housing 348 and back to the cylinder head through appropriate passages (not shown).

The mechanism is operated to change or adjust the timing of camshaft 314 relative to the rotation of the crankshaft in response to an output signal by the ECU 72 (see FIG. 5). First, stepper motor 351 is activated to rotate shaft 353 a desired angular amount appropriate for the phasing change desired. Accordingly, the pinion gear 354 and spur gear 347 are rotated desired amounts. The engagement between interior threads 345 in hub 346 and external threads 344 on the exterior surface 355 of carrier sleeve 337 causes a desired axial movement of the carrier sleeve 337 since rotation of the carrier sleeve is prevented by the stationary pin 357 within groove 356. Since the shifting sleeve 334 is axially blocked by shoulder 341 and snap ring 342 within the carrier sleeve, axial movements of the carrier sleeve 337 carry the shifting sleeve 334 along with it.

As previously discussed, the shifting sleeve 334 is connected to quill-shaft 325 through a pair of meshing sets of straight splines 335 and 329, respectively. In addition, another portion of the shifting sleeve 334 is connected to the camshaft 314 through a pair of meshing sets of helical splines 336 and 331. These splines normally cause the camshaft 314 and quill-shaft 325 to rotate together as a unit. However, during a change in camshaft timing or phasing, the axial movement of the shifting sleeve 334 causes the camshaft to rotate slightly relative to the quill-shaft 325 due to the engagement between set of helical splines. Accordingly, the phase change of camshaft 314 with respect to the quill-shaft 325 results in an angular change between the gear 312 (and sprocket on the crankshaft) This effectively changes the camshaft timing relative to the crankshaft while the engine is running and the mechanism and camshaft is rotation. In this manner, the camshaft can be advanced or retarded as the operational parameters of the engine dictate.

In this fashion, a relatively compact and therefore easily utilized variable valve timing mechanism is available with a substantial portion of the mechanism located within the camshaft itself. Also, the gear arrangement between the stepper motor and rest of the mechanism locks the resultant phase relationship securely in a desired condition to oppose any undesirable transient timing changes caused by reactive torque pulses related to the actions of the cam lobes and valve followers. Thus, a precise and reliable timing mechanism is achieved using mechanical shifters without any hydraulic fluid and attendant pressure concerns and seal problems.

It should be clear that variations and modifications of the inventive device and system are possible without departing from the scope and spirit of the present invention as defined by the appended claims.

The embodiments in which an exclusive property or privilege is claimed are defined as follows:

1. A camshaft timing device for an internal combustion engine characterized by:

a driving sprocket member (312) being coaxially mounted to an axially affixed with respect to one end (313) of a camshaft (314) and angularly rotatable therewith;

an intermediate connection member (334) being coaxially mounted with said camshaft and said driving sprocket member for axial movement relative thereto and for angular motion with respect to one of said shaft and said driving members when said intermediate connection member moves in an axial direction;

said intermediate connection member (334) being operatively connected to a gearing device (347, 354) that is driven by an electric motor (351) to produce axial movement of said intermediate connection member (334) with respect to said rotatable camshaft (314) and driving sprocket (312);

said gearing device (347, 354) providing a unidirectional drive, such as to allow the electric motor to change the angular position of said rotatable camshaft with respect to said driving member as set by said electric motor and gearing device but to prevent torque forces exerted by said camshaft to self-induce timing changes.

2. A camshaft timing device as defined in claim 1 further characterized by:

said gearing device (347, 354) operably connected to a sleeve (337) to produce axial movement of said operatively connected sleeve and intermediate connection member (334) with respect to both said driving member (312) and said camshaft (314).

3. A camshaft timing device as defined in claim 2 further characterized by:

said camshaft (314) being hollow and defining a hollow interior;

said sprocket member (312) being mounted proximate one end (313) of said camshaft;

said gearing device (347, 354) being mounted proximate a second end (332) of said camshaft;

said sprocket member (312) being operatively connected to said gearing device through the hollow interior of said camshaft.

4. A camshaft timing device as defined in claim 3 further characterized by:

said gearing device being in part a gear sprocket (337) that has an internally threaded hub (346) that engages complementary external threads (344) on said sleeve (337);

said gear sprockets engaging a pinion gear (354) connected to an output shaft (353) of said electric motor (351).

5. A camshaft timing device as defined in claim 2 further characterized by:

said intermediate connection member being a shifting shaft (334) that is at least partially mounted for axial sliding motion within said camshaft (314).

6. A camshaft timing device as defined in claim 1 further characterized by:

said electric motor (351) being operably connected to an electric control unit (72) that reads input parameters (70) from an internal combustion engine and produces a motor controlling output signal (74) to the electric motor in response to said input parameters to provide the optimum valve timing in accordance with said input parameters.

7. A camshaft timing device as defined in claim 6 in which the electrical motor (351) is a stepper motor.

8. A camshaft timing device as defined in claim 6 in which said intermediate connection member being a shifting shaft (334) that is at least partially mounted for axial sliding motion within said camshaft (314) and one of the inputs (70) to the electronic control unit (72) is a feedback signal defining the axial position of said shifting shaft.

9. A camshaft timing device as defined in claim 6 in which one of the inputs (70) to the electronic control unit (72) is a feedback signal defining the angular position of said camshaft relative to the angular position of said driving sprocket member.

10. A camshaft timing device as defined in claim 6 in which said electric motor (351) is a reversible direct current motor.

11. A camshaft timing device as defined in either of claims 1 2, 3, 4, or 5 in which the camshaft is the input shaft (7) of a fuel pump (6).

* * * * *